March 27, 1951     E. NITENSON     2,546,905
PLATEHOLDER FOR CAMERAS
Filed Oct. 14, 1948
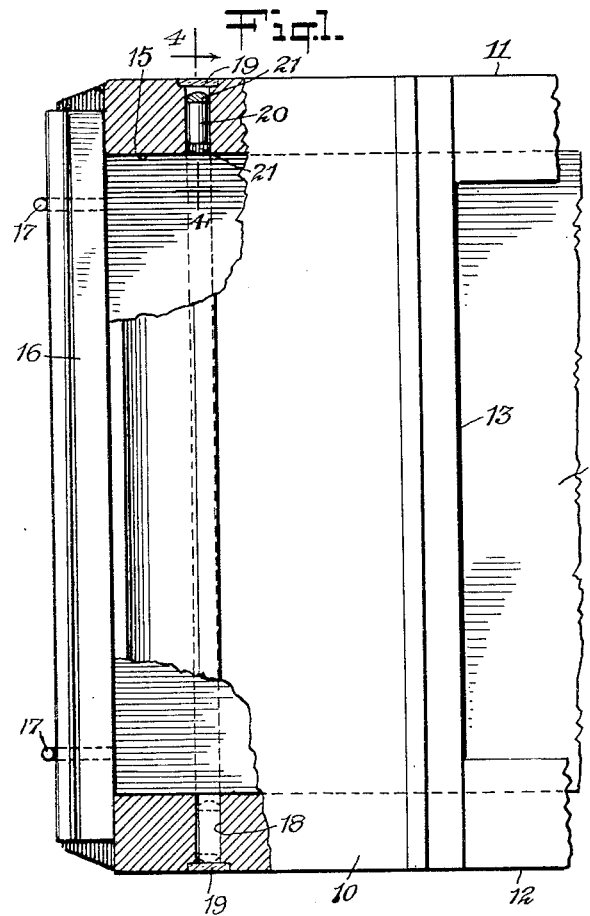
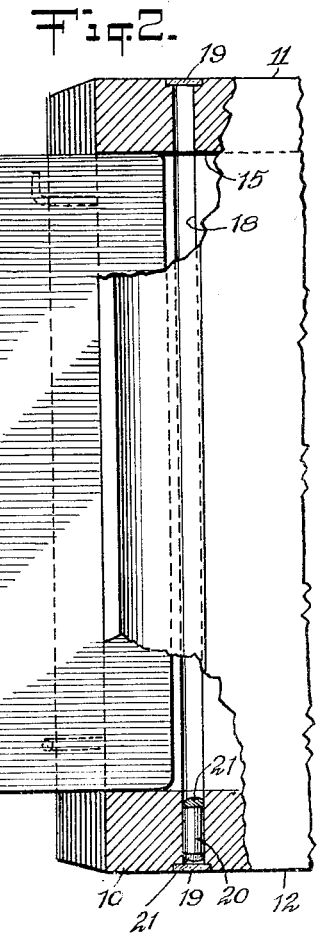
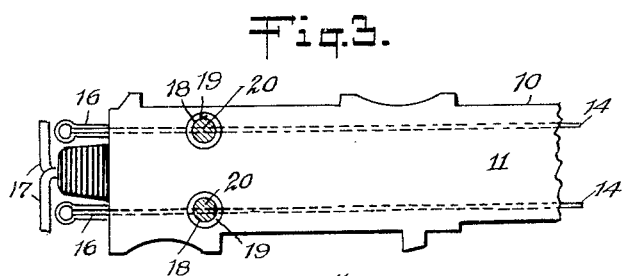
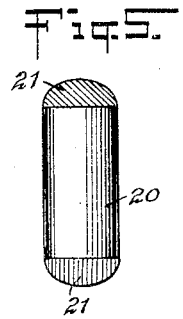
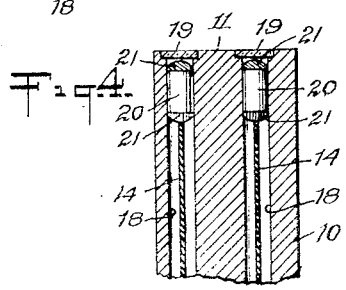
INVENTOR.
Edward Nitenson
BY
Munn, Liddy & Glaccum
Attorneys Patented Mar. 27, 1951

2,546,905

UNITED STATES PATENT OFFICE 2,546,905

PLATEHOLDER FOR CAMERAS

Edward Nitenson, San Luis Obispo, Calif.

Application October 14, 1948, Serial No. 54,493

3 Claims. (Cl. 95—71)

This invention relates to new and useful improvements in plate holders for cameras and has a special reference to simple and efficient indicating means so that a person can tell whether the film in the holder has been exposed or not.

The main object of the invention is to provide a device which will automatically operate when the slide is taken out of the holder to indicate that such action has occurred, without the necessity of a person using the holder, to manipulate or set any element to indicate this condition.

A further object is to provide an extremely simple, efficient and economical construction so that the above advantages may be achieved by a very simple modification of the ordinary plate holder, and not requiring a construction of any special expensive holder.

In brief and general terms, the invention includes a frame, which is shown herein as a plate holder frame, although it is to be clearly understood that the invention is not limited to plate holders necessarily.

Broadly conceived, the invention includes a frame on which a slide is movable in combination with an indicator element which is held in one position on the frame when the slide is in a normal position, and which element is adapted to move to another position on the frame when the slide is removed from normal position.

In one form this frame has a slide-receiving passage into which a slide is normally inserted to cover a film mounted in the frame or for any other purpose. The plate holders, when the slide is pulled out with the holder on a camera, the picture is taken and then the slide is reinserted. In previous constructions, the sides of the end of the slide have been definitely marked as by having one side black, and the other side white, so that when the slide is reinserted with the white side of its end facing outward it would indicate that the film covered by the slide has been exposed. On the other hand, movable elements such as bent pins, have been pivotally mounted on the end of the frame and are movable to positions indicating exposure of the film. In a preferred form of this invention, I provide an indicating device which is movable by gravity on the frame and is normally disposed above the top of the slide and held in this position as long as the slide is inserted, but when the slide is pulled out of the holder, the indicating means will drop to the other side of the holder and be held there when the slide is reinserted. This positioning of the indicating means automatically by gravity requires no manipulations on the part of the operator.

Preferably in one form of the invention, the indicator is in the form of a cylindrical capsule or plug having its ends definitely marked as by different colors. This plug or indicator is readily slidable up and out within a slot formed near the outer side edge of the holder, this slot running transversely to the slide-receiving passage and in the same plane therewith and extends at each end to the bottom and top surface of the holder. Above and below the slide passage in the frame there is room enough in this slot to receive the capsule or plug and as long as the slide is in its passage, the plug will be held at one end or the other. A thin layer of transparent material closes the ends of the slot openings and enables a person to observe what is the color on the plug, observed through said side opening, and from the color can be determined whether the negative in the holder has been exposed or not. Ordinarily, when the plate holder is loaded, the plug or capsule will be moved to the top of the slot and the slide then inserted, this will cause a particular color to be visible through the side opening at the top of the slot.

When the slide is drawn out, the indicator being thus released, will drop to the bottom slot. When the slide is reinserted it will hold the indicator in this bottom portion of the slot and a person examining the indicator will see by the color and its end that the negative has been exposed. It is of course, clear that this same construction and combination of operative elements may be employed for indicating other things and the exposure or non-exposure of a film. After once loading the frame and inserting the slide with the plug at the top of the slot, if a person subsequently finds the slide in its passage but with the indicator at the bottom of the slide, he knows that under ordinary circumstances, the slide has been withdrawn from its passage.

The present preferred form of the invention is shown in the drawing, of which:

Fig. 1 is a partial side elevation, broken away, of one end of the plate holder with a slide inserted;

Fig. 2 is a similar view showing the slide almost entirely removed and far enough to permit the indicator to drop to the other side of the holder;

Fig. 3 is a partial plan view of a holder;

Fig. 4 is a section taken on the line 4—4 of Fig. 1; and,

Fig. 5 is an enlarged elevation of the indicator plug or capsule.

Referring now merely to the present preferred embodiment of the invention shown in the drawings, there is illustrated a plate holder or frame 10 having top edge 11, and bottom edge 12, with the usual opening 13, which is closed by a slide 14, movable in a slide passage 15 in the usual manner. The outer end of the slide is provided with a bent metal edge 16 and may be held in normal closed position by means of the usual bent pins 17.

It is well known of course, that when the slide is pulled out, with the frame on the camera, the film is thus exposed through the opening 13. After this exposure, the slide is reinserted to cover the film and, unless some means is provided to indicate that the slide has been removed and the film exposed, the photographer may pull this same slide out again and make a double exposure on the film.

To avoid this and to provide a simple, and efficient, and economical means of indicating definitely that a film or plate has been exposed, I provide, in the frame adjacent the end thereof from which the slide is pulled, a slot 18 preferably circular and extending across the frame from one edge to the other in a direction transverse to the slide passage 15 and in the plane thereof. The slot 18 extends at each end beyond the edges of the passage 15 and opens to the respective outer faces of the frame. The ends of the slot 18 are closed by pieces of transparent material 19.

Disposed to move freely in the slot 18 is an indicator element 20 preferably in the form of a cylindrical elongated plug of a diameter permitting it to freely move in the slot, and having opposite ends 21 marked with different colors as indicated in Fig. 5. As shown in Fig. 1, the slot 18 extends sufficiently beyond the adjacent edge of the slide 14 to form a chamber long enough to house the indicator and when the holder is placed on the camera in a vertical plane, the indicator will rest on the top edge of the slide with one colored end visible through the adjacent transparent pane 19. It is perfectly clear that when the photographer pulls out the slide 14 for the purpose of taking a picture, the end of it will pass beyond the slot as shown in Fig. 2, and the indicator will drop by gravity through the slot to the bottom thereof as shown in Fig. 2, so that its differently colored opposite end will lie adjacent the other transparent pane 19. After the exposure of the picture, the slide is reinserted and therefore, will hold the indicator in this new position.

After the plate holder is emptied and new films or plates are put in it, the holder can be turned upside-down in the dark room to allow the indicator to move to the other end of the slot after which the slide can be inserted to hold the indicator in this position, whereupon, the device is ready to have this operation repeated.

It is obvious from Figures 3 and 4, that in the one plate holder we have two indicators because most holders are constructed to receive two plates or films.

While the invention has been described in detail and with respect to the preferred form shown in the drawings, it is not to be limited to such details and forms since many changes and modifications may be made in the invention without departing from the spirit and scope of the invention in its broadest aspects. Hence, it is intended to cover any and all forms and modifications of the invention which may come within the language or scope of any one or more of the appended claims.

What I claim as my invention, is:

1. In combination, a frame having a slide-receiving passage, a slide normally disposed in said passage, said frame having a slot extending transversely of the passage and in the plane thereof from one side of the frame to the other, and an indicator plug movable in said slot and held at one end thereof by the slide and movable by gravity to the other end of the slot when the slide is removed from the frame.

2. In combination, a frame having a slide-receiving passage, a slide normally disposed in said passage, said frame having a slot extending transversely of the passage and in the plane thereof from one side of the frame to the other, and an indicator plug movable in said slot and held at one end thereof by the slide and movable by gravity to the other end of the slot when the slide is removed from the frame, the ends of said indicator element being differently marked.

3. In combination, a frame having a slide-receiving passage, a slide normally disposed in said passage, said frame having a slot extending transversely of the passage and in the plane thereof from one side of the frame to the other, and an indicator plug movable in said slot and held at one end thereof by the slide and movable by gravity to the other end of the slot when the slide is removed from the frame, the ends of said indicator element being differently marked, the ends of said slot opening into the opposite faces of the frame, and transparent material closing these ends but permitting observation of the plug disposed therein.

EDWARD NITENSON.

REFERENCES CITED

The following references are of record in the file of this patent:

UNITED STATES PATENTS

| Number | Name | Date |
|---|---|---|
| 479,186 | Hare | July 19, 1892 |
| 484,569 | Pierce | Oct. 18, 1892 |
| 2,462,683 | Schwartz et al. | Feb. 22, 1949 |

FOREIGN PATENTS

| Number | Country | Date |
|---|---|---|
| 1,423 | Great Britain | of 1911 |
| 366,669 | Germany | Jan. 9, 1923 |